US010877178B2

(12) United States Patent
Wu et al.

(10) Patent No.: US 10,877,178 B2
(45) Date of Patent: Dec. 29, 2020

(54) METHOD FOR SUPPRESSING AIRBORNE TRANSIENT ELECTROMAGNETIC IN-BAND VIBRATION NOISE

(71) Applicants: Xin Wu, Beijing (CN); Guoqianq Xue, Beijing (CN); Qingyun Di, Beijing (CN)

(72) Inventors: Xin Wu, Beijing (CN); Guoqianq Xue, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 90 days.

(21) Appl. No.: 16/402,261

(22) Filed: May 3, 2019

(65) Prior Publication Data

US 2020/0348438 A1    Nov. 5, 2020

(51) Int. Cl.
*G01V 3/38* (2006.01)
*G06K 9/00* (2006.01)
*G06N 3/08* (2006.01)
*G06N 3/04* (2006.01)
*G01V 13/00* (2006.01)

(52) U.S. Cl.
CPC ............... *G01V 3/38* (2013.01); *G01V 13/00* (2013.01); *G06K 9/00516* (2013.01); *G06N 3/0454* (2013.01); *G06N 3/088* (2013.01)

(58) Field of Classification Search
CPC ........ G01V 3/38; G01V 13/00; G06N 3/0454; G06N 3/088; G06K 9/00516
USPC .......... 324/323, 97, 750.23, 750.27, 324/754.21–754.31
See application file for complete search history.

(56) References Cited

U.S. PATENT DOCUMENTS

| 2010/0277159 | A1* | 11/2010 | Ng ....................... G01J 3/28 324/97 |
| 2013/0262073 | A1* | 10/2013 | Asaad ................ G06F 30/331 703/14 |
| 2014/0006875 | A1* | 1/2014 | Vedula .............. G06F 11/0775 714/45 |

* cited by examiner

*Primary Examiner* — Giovanni Astacio-Oquendo

(57) ABSTRACT

Disclosed in the present invention is a method for suppressing airborne transient electromagnetic in-band vibration noise, comprising: dividing the data after current turn-off into two segments according to whether the useful signal is attenuated to the system noise level: the segment A is the useful signal segment, and the segment B is the pure noise segment; limiting the bandwidth of the data of the segment B according to the frequency range of the in-band noise, and labeling the result as BL; training a neural network using the BL, utilizing the well trained neural network to predict the in-band vibration noise contained in the data of the segment A, and labeling the prediction result as PNA; and subtracting the PNA from the data of the segment A to suppress the in-band vibration noise contained in the data of the segment A.

8 Claims, 5 Drawing Sheets

METHOD FOR SUPPRESSING AIRBORNE TRANSIENT ELECTROMAGNETIC IN-BAND VIBRATION NOISE

TECHNICAL FIELD

The present invention relates to the technology for suppressing airborne transient electromagnetic in-band vibration noise, which belongs to the geophysical exploration technology.

BACKGROUND ART

Transient electromagnetic method (TEM) is a widely used geophysical electromagnetic detection method based on the principle of the law of electromagnetic induction. The method usually utilizes a loop or a grounded wire as a transmitting device to transmit a pulsed electromagnetic field (primary field) to the ground. Under the excitation of the primary field, an induced eddy current is generated inside the earth. After the induced eddy current attenuates, a new electromagnetic field (secondary field) is generated. The inductive magnetometer as sensor is usually used to observe the second field, and the geoelectric information contained therein is extracted and analyzed to achieve the purpose of detecting the underground geological bodies.

Referring now to FIG. 1, shown is a working device diagram of a typical ground TEM method. Since the sensor is concentric with the transmitter loop, it is called "central loop". The device has been widely used for its simple form and the observation results are easy to explain.

In the actual field work, in order to overcome the difficulty in rapidly carrying out the ground detection method in the desert, Gobi, terrain complex areas and vegetation coverage areas, the researchers carry the traditional ground detection equipment on the flight platform, thereby generating airborne transient electromagnetic method (ATEM).

Based on the different flight platforms, ATEM systems can be divided into two forms: the fixed-wing airborne TEM system (FTEM) and the helicopter-borne TEM system (HTEM). Referring now to FIG. 2, shown is a schematic diagram of a typical FTEM system. The transmitter loop is carried around the aircraft through the structure. The sensor is mounted by a sensor bird, and the bird is connected to the aircraft by a retractable towline. When the aircraft takes off, the bird is tightened to the belly. After entering the observation state, the towline is released, such that the bird is towed about 100 meters behind the tail of the aircraft. Referring now to FIG. 3, shown is a schematic diagram of a typical HTEM system. The transmitter loop and the sensor are both carried on a concentric circles structure. The transmitter loop and the sensor are connected to the abdomen of the aircraft through load-bearing cables. By properly designing the length of each cable, the planes of the transmitter loop and the sensor can be parallel to the ground surface when the observation system performs normal observation (i.e., the flight speed is constant).

Regardless of the type of flight platforms, the ATEM detection system can significantly improve the detection efficiency compared with the ground detection method. However, the difference between the ground detection and the ATEM observation is that the ground detection is a static observation, that is, the observation system is statically placed on the ground during the observation process; while for the ATEM observation, the observation system is in motion relative to the ground.

The observation process of this motion may produce an interference signal, and the formation mechanism of the interference signal is as follows. Since the observation process is in motion, that is, the sensor is in motion in the geomagnetic field, and due to the inhomogeneity of the geomagnetic field itself, the magnetic flux of the geomagnetic field in the sensor changes with the change of the position of the sensor. According to Faraday's law of electromagnetic induction, the changes in the magnetic flux within the sensor can produce an induced electromotive force. The induced electromotive force is completely caused by the motion of the observation system and is irrelevant to the underground information. Therefore, the induced electromotive force is a kind of noise with respect to the useful signal, so it is called motion-induced noise. The motion-induced noise is related to many factors, and the amplitude of the motion-induced noise is larger than the late ATEM response signal. However, under normal conditions, that is under the condition of stable flight and good weather, the main frequency range of the motion-induced noise is lower than the ATEM detection fundamental frequency and generally does not overlap with the frequency range of the ATEM detection useful signal, such that the suppression can be easily achieved by spectral separation (high-pass filtering, polynomial fitting, wavelet transform, empirical mode decomposition, etc).

FIG. 4(a) is a segment of the ATEM observed raw data, and FIG. 4(b) is an enlargement of the dotted line portion in the middle of FIG. 4(a). In FIG. 4(b), curve 5 is the raw observation data of the ATEM, and the significant vibration is shown in FIG. 4(b), that is, the motion noise in the traditional sense. Curve 6 is the data processed by the traditional motion noise suppression method. It can be seen that the motion noise in the traditional sense has been substantially eliminated.

However, a relatively strong high-frequency vibration can be further observed from the second cycle to the 3.5th cycle of curve 6 in FIG. 4(b). The data of the 2.5 th period can be extracted for spectrum analysis and compared with the data of the 4.5th period without such high-frequency vibration. The result is shown in FIG. 5, where curve 8 is the spectrum of the date of the 2.5th period. It can be seen that such high-frequency vibration has large amplitude and the spectrum range is mainly around 1 kHz. After studying on this kind of noise contained in FIG. 4(b), the formation cause can be found to be related to the short-term and rapid change of the flight state of the detection system in actual flight, such as occasional transverse turbulent airflow or the pilot's need to rapidly change the flight state for some reasons (acceleration or rapid turning, etc.). Under such conditions, the high-frequency vibration occurs in the sensor, thus bringing about this kind of noise. Therefore, this kind of noise can be called vibration noise (a special kind of motion noise). Further research shows that this kind of noise also has the following characteristics: first, it exists for a short time and observation data segments that can be affected are limited; second, the spectrum range is typically from 0.5 kHz to 5 kHz, within the frequency range of the ATEM useful signal; and third, in most cases, this kind of noise does not have the generalized stationary randomness. Considering the above factors, this kind of noise can be called "In-Band Vibration Noise" (IBV noise for short).

The motion noise in the traditional sense is "out-of-band noise", because its frequency range is lower than the frequency range of the ATEM useful signal and it does not overlap with the spectrum of the ATEM useful signal. Therefore, the motion noise in the traditional sense is easy to be suppressed by spectrum separation. However, the frequency range of the IBV noise is within the frequency range of the ATEM useful signal, so it is difficult to be suppressed by spectral separation. That is to say, it is difficult to suppress the IBV noise by the traditional motion noise suppression method.

SUMMARY OF THE INVENTION

In order to solve the above technical problems, the present invention provides a method for suppressing airborne transient electromagnetic in-band vibration noise, in order to solve the problem that the IBV noise cannot be suppressed by the traditional motion noise suppression method.

The method for suppressing airborne transient electromagnetic in-band vibration noise in the present invention includes the following steps:

S1, the ATEM signal after current turn-off contained the IBV noise, dividing the signal into two segments according to whether the useful signal is attenuated to the system noise level: the segment A is the useful signal segment, and the segment B is the pure noise segment;

S2, processing the data of the segment B, limiting the bandwidth of the data of the segment B to be just greater than the bandwidth of the IBV noise, and labeling result as $B_L$;

S3, training a wavelet neural network using the data $B_L$, utilizing the well trained wavelet neural network to predict the IBV noise contained in the data of the segment A, and labeling the prediction result as $N_A$; and S4, subtracting the $N_A$ from the data of the segment A to suppress the in-band noise contained in the data of the segment A.

Further, the processing the date of the segment B in S2 includes low pass filtering.

Further, the processing the date of the segment B in S2 includes empirical mode decomposition.

Further, training the wavelet neural network using the data $B_L$ and then utilizing the well trained wavelet neural network to predict the IBV noise contained in the data of the segment A in S3 includes:

S3.1, arranging the data $B_L$ in reverse that is labeled as $B_{LR}$;

S3.2, utilizing the $B_{LR}$ to train the wavelet neural network;

S3.3, utilizing the well trained wavelet neural network to predict the IBV noise contained in the data of the segment A, and labeling a prediction result as $PN_{AR}$; and S3.4, reversing the data sequence $PN_{AR}$ to obtain the final prediction result $PN_A$. Further, the utilizing the $B_{LR}$ to train the wavelet neural network in S3.2 includes: constructing two sets of data Input and Output, respectively as an input and an output of the wavelet neural network:

$$\text{Input} = \begin{bmatrix} B_{LR}(1) & B_{LR}(2) & \ldots & B_{LR}(n) \\ B_{LR}(2) & B_{LR}(3) & \ldots & B_{LR}(n+1) \\ \vdots & \vdots & \vdots & \vdots \\ B_{LR}(N-n) & B_{LR}(N-n+1) & \ldots & B_{LR}(N-1) \end{bmatrix}$$

$$\text{Output} = \begin{bmatrix} B_{LR}(n+1) \\ B_{LR}(n+2) \\ \vdots \\ B_{LR}(N) \end{bmatrix}$$

and constructing the wavelet neural network, and making prediction accuracy reach convergence requirements through iterative training, where n is the number of nodes in an input layer of the wavelet neural network.

Further, n is determined based on sequence characteristics of the IBV.

Further, in S3.2, when the number of nodes in the input layer of the wavelet neural network is n, the number of nodes in a hidden layer is 2-3 n, and the number of nodes in an output layer is 1.

Further, the utilizing the trained wavelet neural network to predict the high-frequency vibration in-band noise contained in the data of the segment A in S3.3 includes: utilizing the $[B_{LR}(N-n+1) \ [B_{LR}(N-n+2) \ldots B_{LR}(N)]$ as input data to predict a value of the IBV contained in a last date point in the date sequence of the segment A, and advancing point by point until completing prediction of values of the IBV of all data points in the data sequence of the segment A, in order to obtain the sequence $PN_{AR}$.

The method provided in the present invention can effectively suppress the airborne transient electromagnetic in-band vibration noise, and may lay a good date foundation for subsequent data processing and inversion interpretation.

BRIEF DESCRIPTION OF THE DRAWINGS

The drawings are used to provide a further understanding of the technical solution of the present invention and constitute a part of the specification. Also, the drawings serve to explain the technical solution of the present invention together with the embodiments of the present invention, and do not constitute a limitation on the technical solution of the present invention.

DETAILED DESCRIPTION OF THE INVENTION

The following description of the embodiments of the present invention will clearly and completely describe the purpose, the technical schemes and the advantages of the present invention with reference to the drawings. It should be noted that the embodiments of the present invention and the features in the embodiments can be in any combination with each other without conflict.

The technical schemes of the present invention will be described in detail below by particular embodiments.

The method for suppressing the airborne transient electromagnetic in-band vibration noise in the embodiments can include the following steps.

S1, the ATEM data after current turn-off containing the IBV noise can be divided into two segments according to whether the useful signal is attenuated to the system noise level: the segment A is the useful signal segment, and the segment B is the pure noise segment.

Figure 6:
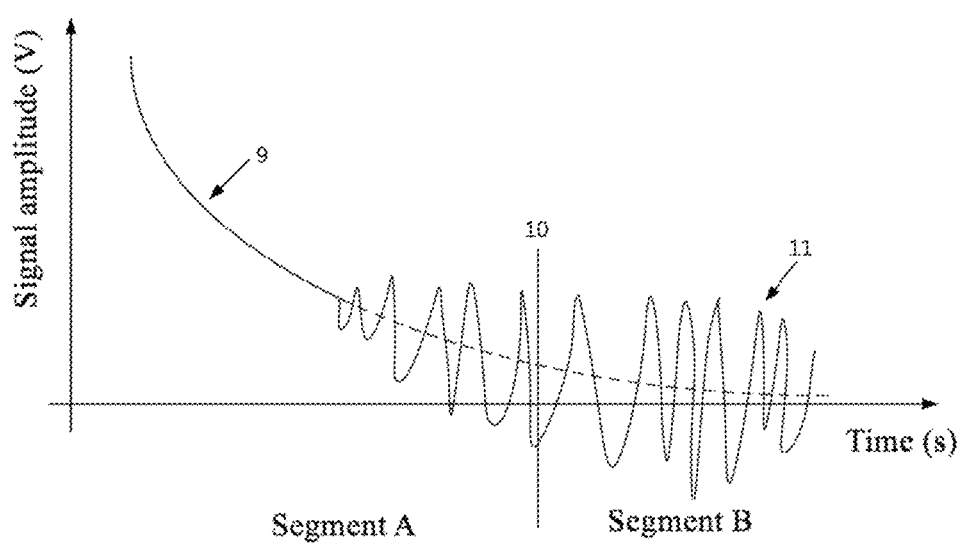
FIG. 6 is a diagram of the data segment, in which 9 represents the ATEM useful signal, 10 represents the segment point, and 11 represents the IBV noise.

The general form of the ATEM useful signal is in an exponential decay form. As shown in FIG. 6, the ATEM data containing the IBV noise can be divided into two segments, and the segment point is based on the system noise level. That is, the data can be divided into two segments: segment A and segment B. The useful signal contained in the segment A has not yet been fully attenuated (the signal amplitude is higher than the system noise level). While in the segment B, the ATEM useful signal has been fully attenuated (i.e., the ATEM useful signal cannot be contained in the segment B), and the data of the segment B can mainly consist of the IBV noise and other wide-band stationary random noise.

S2, the data of the segment B can be processed to limit the bandwidth of the data of the segment B to be just greater than the bandwidth of the IBV noise. Specifically, the low-pass filtering, the empirical mode decomposition, and other methods can be applied to limit the bandwidth of the data of the segment B to be slightly greater than the bandwidth of the IBV noise, thereby avoiding the influence of the wide-band random noise on the subsequent processing. After the processing, the bandwidth-limited data of the segment B can be obtained and labeled as BL.

S3, the wavelet neural network can be trained using the data $B_L$ and utilized to predict the IBV noise contained in the data of the segment A, and the prediction result can be labeled as $PN_A$.

The purpose of this step is to train a wavelet neural network (WNN) utilizing the data $B_L$, in order to achieve the prediction to the IBV noise contained in the data of the segment A. The so-called "prediction" usually uses the early data to predict the late data in the time sequence. But in practice, the data of the segment A is located in the early stage of the data of the segment B. Therefore, in order to realize the prediction of IBV in the data of the segment A using the data of the segment B, the data of the segment B (i.e., data $B_L$) may need to be reversely arranged and to be used to train the WNN to realize the prediction of the IBV noise contained in the data of the segment A. In fact, the result of this prediction actually corresponds to the reverse sequence of the IBV noise contained in the data of the segment A (labeled as $PN_{AR}$). By reversing the prediction result sequence $PN_{AR}$, the prediction sequence in correct time direction ($PN_A$) of the IBV noise contained in the data of the segment A can be obtained.

The specific method of training the WNN using the data segment $B_{LR}$ is as follows. Assuming that the data length of $B_{LR}$ is N, firstly two groups of data are constructed as the input and output of the WNN:

$$\text{Input} = \begin{bmatrix} B_{LR}(1) & B_{LR}(2) & \dots & B_{LR}(n) \\ B_{LR}(2) & B_{LR}(3) & \dots & B_{LR}(n+1) \\ \vdots & \vdots & \vdots & \vdots \\ B_{LR}(N-n) & B_{LR}(N-n+1) & \dots & B_{LR}(N-1) \end{bmatrix}$$

$$\text{Output} = \begin{bmatrix} B_{LR}(n+1) \\ B_{LR}(n+2) \\ \vdots \\ B_{LR}(N) \end{bmatrix}$$

That is to say, the (n+1)th data can be predicted by using any continuous n data in the $B_{LR}$ sequence, in other words, the (n+1)th data is related to the previous n data. The value of n is related to the sequence characteristics of the specific IBV to be suppressed. After determining the value of n, a WNN is constructed with n nodes in the input layer, 2 n-3 n nodes in the hidden layer and 1 node in the output layer. Through iterative training, the prediction accuracy can meet the convergence requirement.

After the WNN training is completed, the IBV value contained in the last data point of the data sequence of the segment A (i.e., the first data in the reverse sequence $A_R$ of the data of the segment A) is predicted using $[B_{LR}(N-n+1) \dots B_{LR}(N)]$ as the input data. Then the prediction is advanced point by point until completing the prediction of the IBV values of all data points of the segment A to obtain the $PN_{AR}$ sequence. The $PN_{AR}$ sequence can be reversed to obtain the prediction result of the high-frequency motion noise of the IBV in the data of the segment A.

Fourth, the $PN_A$ can be subtracted from the data of the segment A to suppress the in-band noise contained in the data of the segment A.

Figure 1:
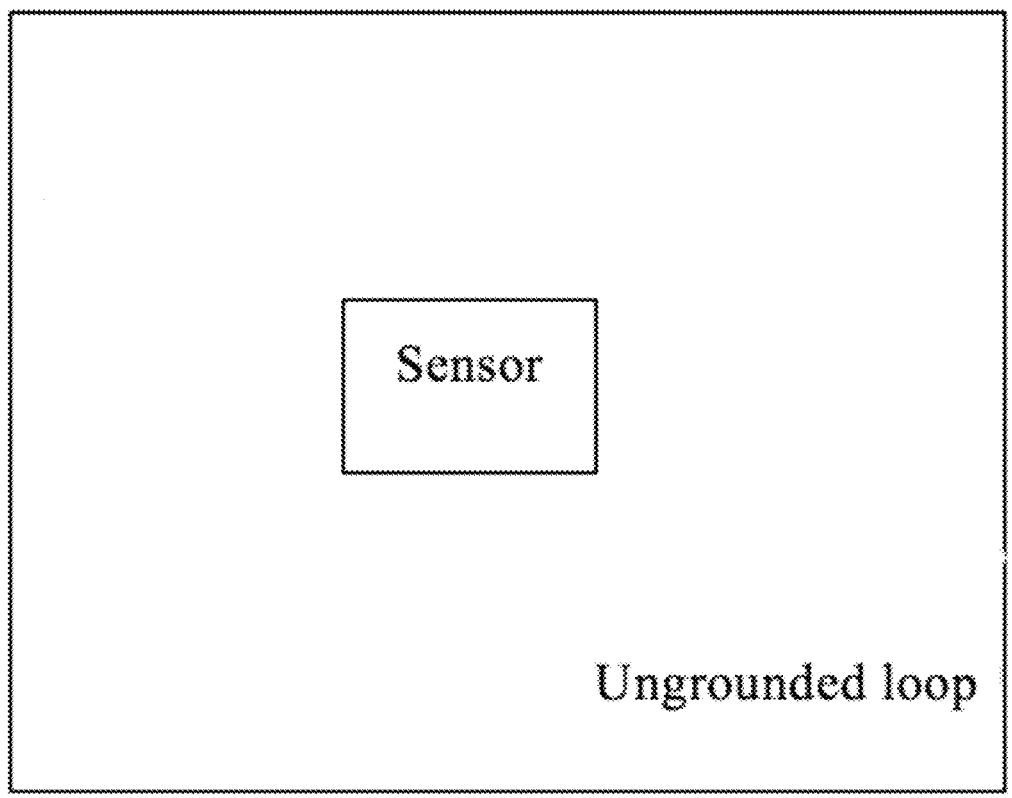
FIG. 1 is a schematic diagram of a traditional central loop transient electromagnetic detection device.
Figure 2:
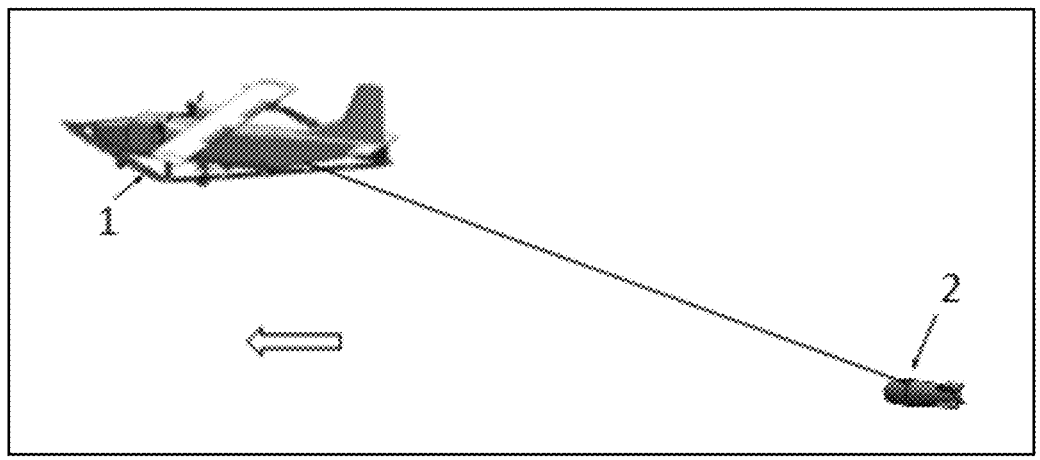
FIG. 2 is a schematic diagram of an airborne transient electromagnetic system based on the fixed-wing aircraft, in which 1 represents the transmitter loop, 2 represents the bird, and the arrow represents the flight direction of the aircraft.
Figure 3:
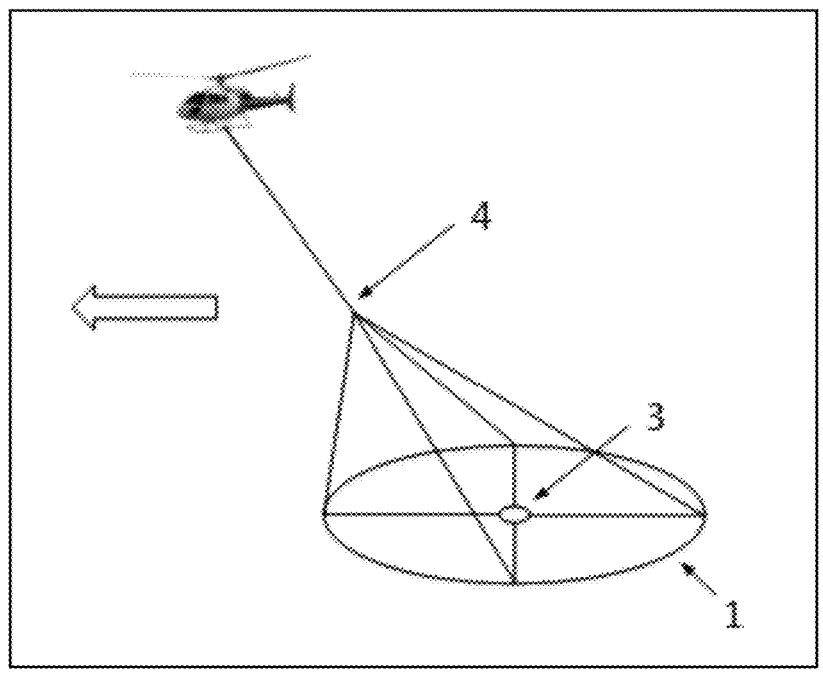
FIG. 3 is a schematic diagram of an airborne transient electromagnetic system based on the helicopter, in which 3 represents the sensor, 4 represents the bearing cable, and the arrow represents the flight direction of the aircraft.
Figure 4:
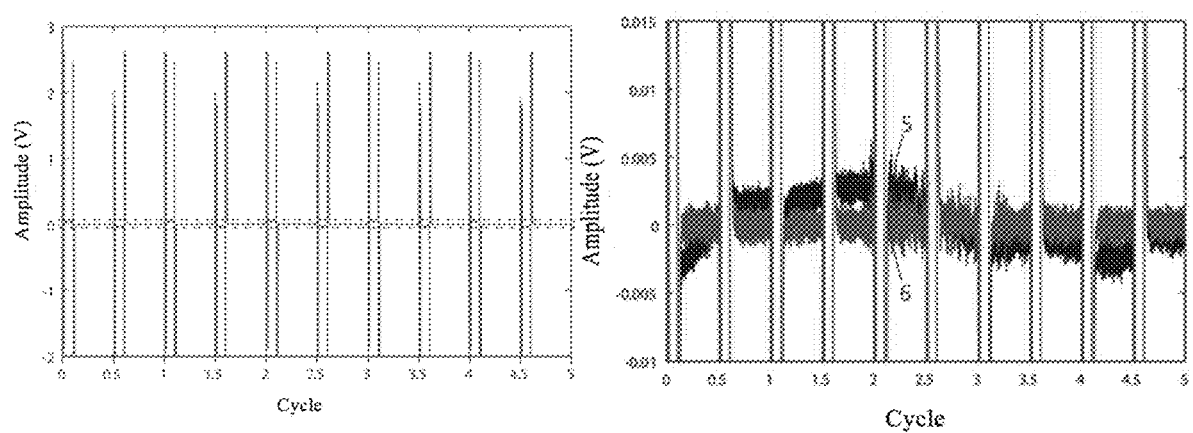
FIG. 4 is an effect diagram of the traditional motion noise processing, in which 5 represents the ATEM raw observation data, and 6 represents the data processed by the traditional motion noise suppression method.
Figure 5:
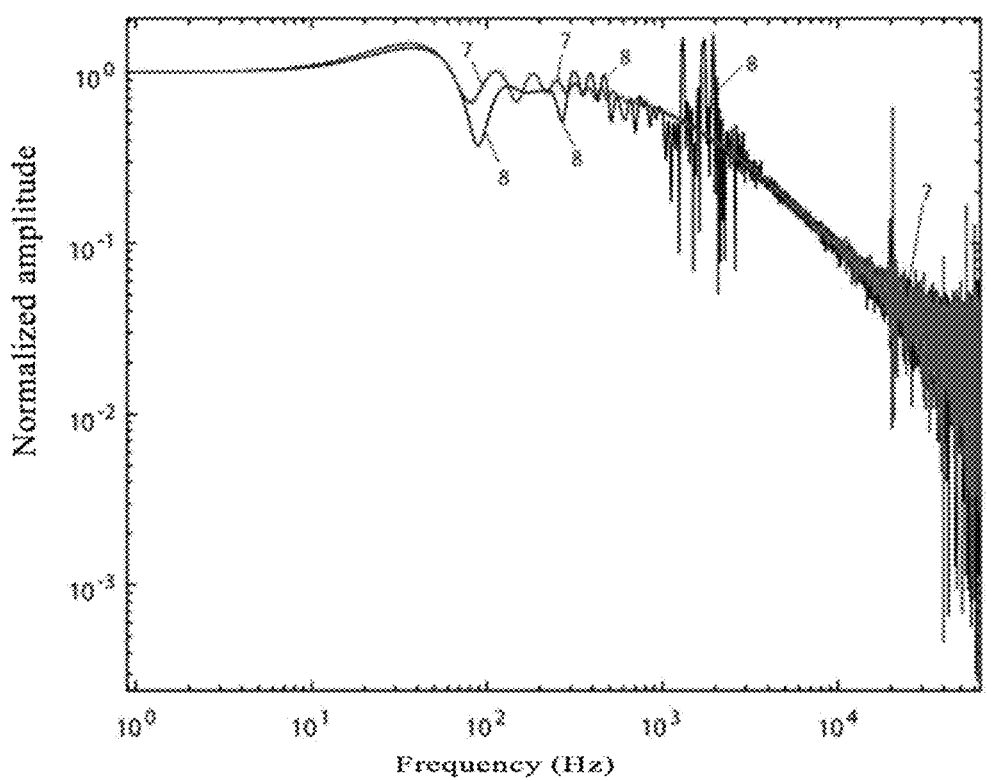
FIG. 5 is a spectrum analysis diagram of the data, in which 7 represents a signal containing no in-band vibration noise, and 8 represents a signal containing the in-band vibration noise.

The measured data of the 2.5th period in FIG. 4(b) can be taken as an example. First, the data can be divided into two segments. In the previous segment, the transient electromagnetic response is attenuated to approximately the same amplitude as the IBV noise signal. In the latter segment, the transient electromagnetic response is completely attenuated, and the IBV noise signal dominates the data.

Figure 7:
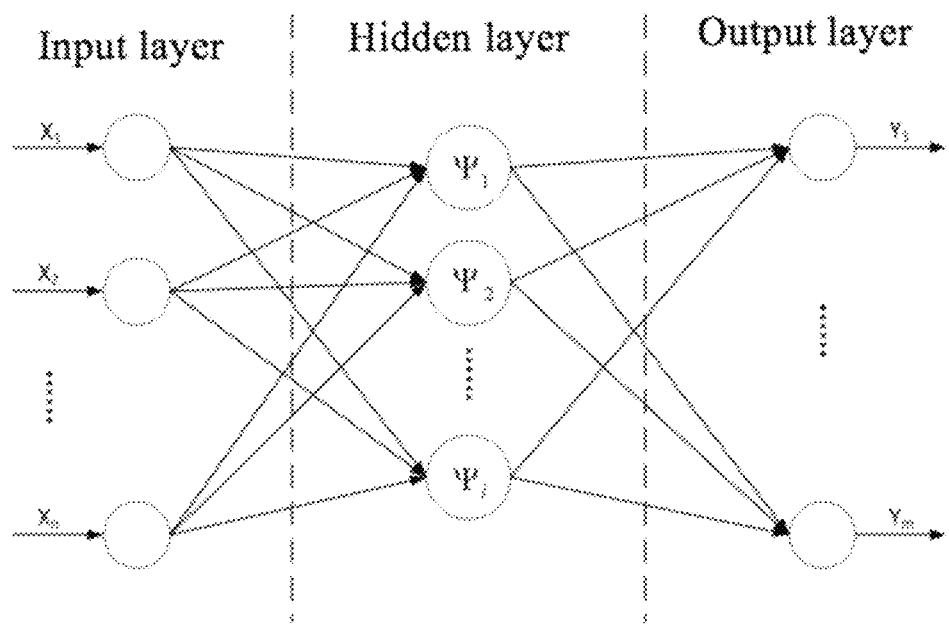
FIG. 7 is a topology diagram of the wavelet neural network.

According to the characteristics of the motion noise, the wavelet neural network is selected for suppressing the IBV noise. The wavelet neural network (WNN) is developed from the back propagation (BP) neural network. The wavelet basis function is used as the transfer function of the nodes in the hidden layer of the BP neural network. The basic topology of the WNN is shown in FIG. 7.

The topology of the WNN is mainly divided into the input layer, the hidden layer and the output layer. Signals $X_1$, $X_2$ to $X_n$ contained in the input layer are input signals of the WNN, and signals $Y_1$ to $Y_m$ in the output layer are the predicted input signals of the WNN. The hidden layer is between the input layer and the output layer. Compared with the traditional artificial neural network, the WNN uses the wavelet basis function $\Psi$ to replace the traditional Sigmoid function in the hidden layer. In this example, the wavelet basis function is as follows:

$$\Psi(x) = \cos(1.75x)e^{-x^2/2}$$

The arrows between each element of the input layer and each element of the hidden layer represent input connection weights, and arrows between each element of the hidden layer and each element of the output layer represent output connection weights. It can be seen from the above arrows that: (1) there is no interconnection between elements of the same layer; and (2) all layers are interconnected, that is, any element of any layer and all elements of other layers are interconnected. It can be seen from the topology that the WNN is actually equivalent to using wavelet basis function as the core, and the mapping relationship between the input function and the output function is constructed through the parameter training.

A WNN with a 5-9-1 structure is designed. That is, the input layer contains 5 nodes, the hidden layer contains 9 nodes, and the output layer contains 1 node. The above structure also means that each data value is related to the previous 5 data values (the previous selection of n).

After completing the training of WNN, it is used to predict the IBV noise contained in the data of the segment A. The result is shown in FIG. 8.

Figure 8:
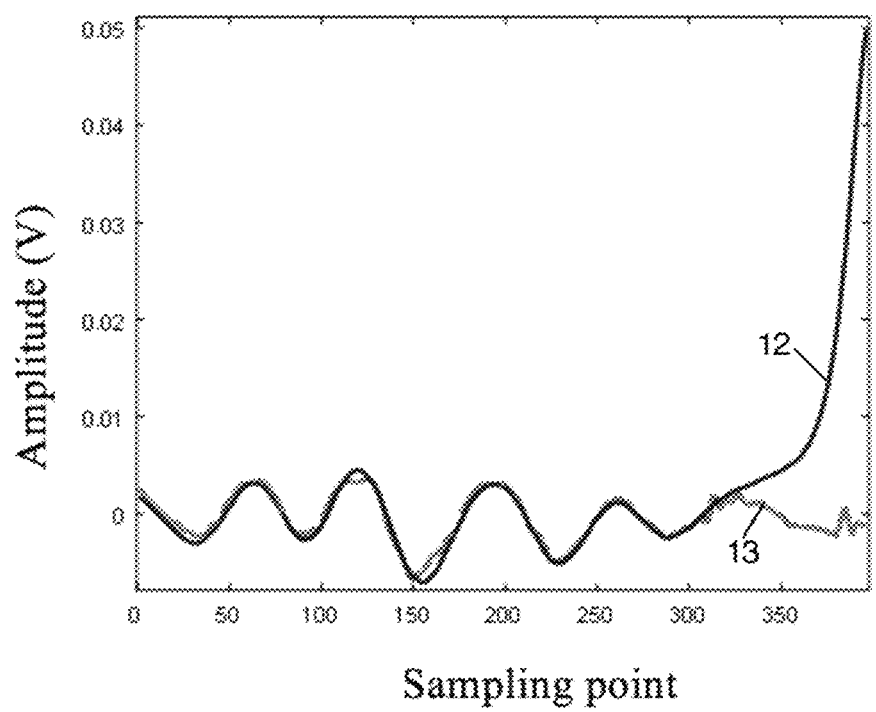
FIG. 8 is prediction results ($PN_{AR}$) of the IBV of the data in the segment A, in which 12 represents the original signal, and 13 represents the predicted IBV signal.
Figure 9:
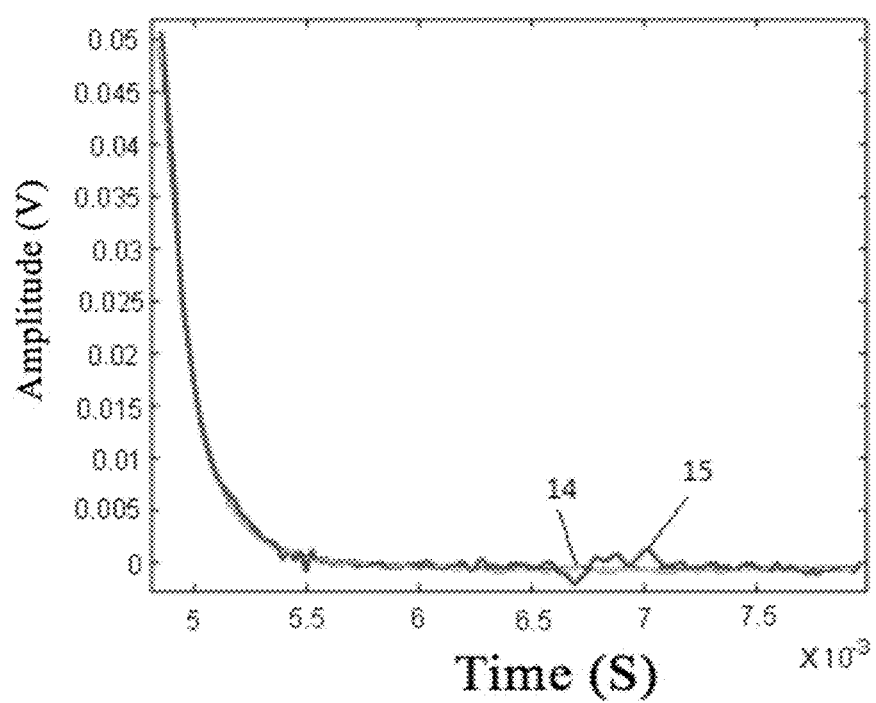
FIG. 9 is a removal result of IBV noise, in which 14 represents a signal containing no in-band noise in adjacent periods, and 15 represents a signal after the in-band noise processed based on the wavelet neural network.

The horizontal axis of FIG. 8 is the sampling points in reverse chronological order. The prediction data in FIG. 8 is reversed, and the reversed data of the prediction data is subtracted from the raw data to obtain the result after the IBV noise is processed. The result is compared with the data without the IBV noise in the adjacent period, which is shown in FIG. 9. It can be seen from FIG. 9 that the above method can effectively suppress the IBV noise and lay a good data foundation for subsequent data processing and inversion interpretation.

While the embodiments of the present invention have been described above, it may be understood that they are only for the understanding of the present invention and they are not intended to limit the invention to these embodiments. Any modifications and variations in the form and details of the embodiments can be made by those skilled in the art within the spirit and scope of the invention. However, the scope of patent protection of the invention may still be defined by the appended claims.

The invention claimed is:
1. A method for suppressing airborne transient electromagnetic high-frequency vibration in-band noise, characterized in that the method comprises the following steps:
S1, the airborne transient electromagnetic signal after current turn-off containing in-band vibration noise, dividing the signal into two segments A and B according to whether the useful signal is attenuated to the system noise level: the segment A is the useful signal segment, and the segment B is the pure noise segment;
S2, processing data of the segment B, limiting a bandwidth of the data of the segment B to be just greater than a bandwidth of the in-band vibration noise, and labeling the result as $B_L$;
S3, training a wavelet neural network using the data $B_L$, utilizing the well trained wavelet neural network to predict the in-band vibration noise contained in the data of the segment A, and labeling a prediction result as $PN_A$; and
S4, subtracting the $PN_A$ from the data of the segment A to suppress the in-band noise contained in the data of the segment A.
2. The method of claim 1, characterized in that processing the data of the segment B in S2 comprises low pass filtering.

3. The method of claim 1, characterized in that processing the data of the segment B in S2 comprises empirical mode decomposition.
4. The method of claim 1, characterized in that training the wavelet neural network using the data $B_L$ and then utilizing the well trained wavelet neural network to predict the in-band vibration noise contained in the data of the segment A in S3 comprises:
S3.1, arranging the data $B_L$ in reverse that is labeled as $B_{LR}$;
S3.2, utilizing the $B_{LR}$ to train the wavelet neural network;
S3.3, utilizing the well trained wavelet neural network to predict the in-band vibration noise contained in the data of the segment A, and labeling a prediction result as $PN_{AR}$; and
S3.4, reversing the data sequence $PN_{AR}$ to obtain the final prediction result $PN_A$.
5. The method of claim 4, characterized in that utilizing the $B_{LR}$ to train the wavelet neural network in S3.2 comprises:
constructing two sets of data Input and Output respectively as an input and an output of the wavelet neural network, $$\text{Input} = \begin{bmatrix} B_{LR}(1) & B_{LR}(2) & \ldots & B_{LR}(n) \\ B_{LR}(2) & B_{LR}(3) & \ldots & B_{LR}(n+1) \\ \vdots & \vdots & \vdots & \vdots \\ B_{LR}(N-n) & B_{LR}(N-n+1) & \ldots & B_{LR}(N-1) \end{bmatrix}$$

$$\text{Output} = \begin{bmatrix} B_{LR}(n+1) \\ B_{LR}(n+2) \\ \vdots \\ B_{LR}(N) \end{bmatrix}$$

and constructing the wavelet neural network, and making prediction accuracy reach convergence requirements through iterative training, wherein n is the number of nodes in an input layer of the wavelet neural network.
6. The method of claim 5, characterized in that the value of n is determined based on sequence characteristics of the high-frequency vibration in-band noise.
7. The method of claim 4, characterized in that in S3.2, when the number of nodes in the input layer of the wavelet neural network is n, a hidden layer contains 2 n-3 n nodes and the number of nodes in an output layer is 1.
8. The method of claim 7, characterized in that utilizing the trained wavelet neural network to predict the high-frequency vibration in-band noise contained in the data of the segment A in S3.3 comprises:
utilizing [$B_{LR}$(N-n+1) [$B_{LR}$(N-n+2) . . . $B_{LR}$(N)] as input data to predict a value of the high-frequency vibration in-band noise contained in a last date point in the date sequence of the segment A, and advancing the prediction point by point until completing the prediction of values of the high-frequency vibration in-band noise of all data points in the data sequence of the segment A, in order to obtain the sequence $PN_{AR}$.

* * * * *